No. 883,318. PATENTED MAR. 31, 1908.
G. KOMM.
FLY TRAP.
APPLICATION FILED JULY 11, 1907.
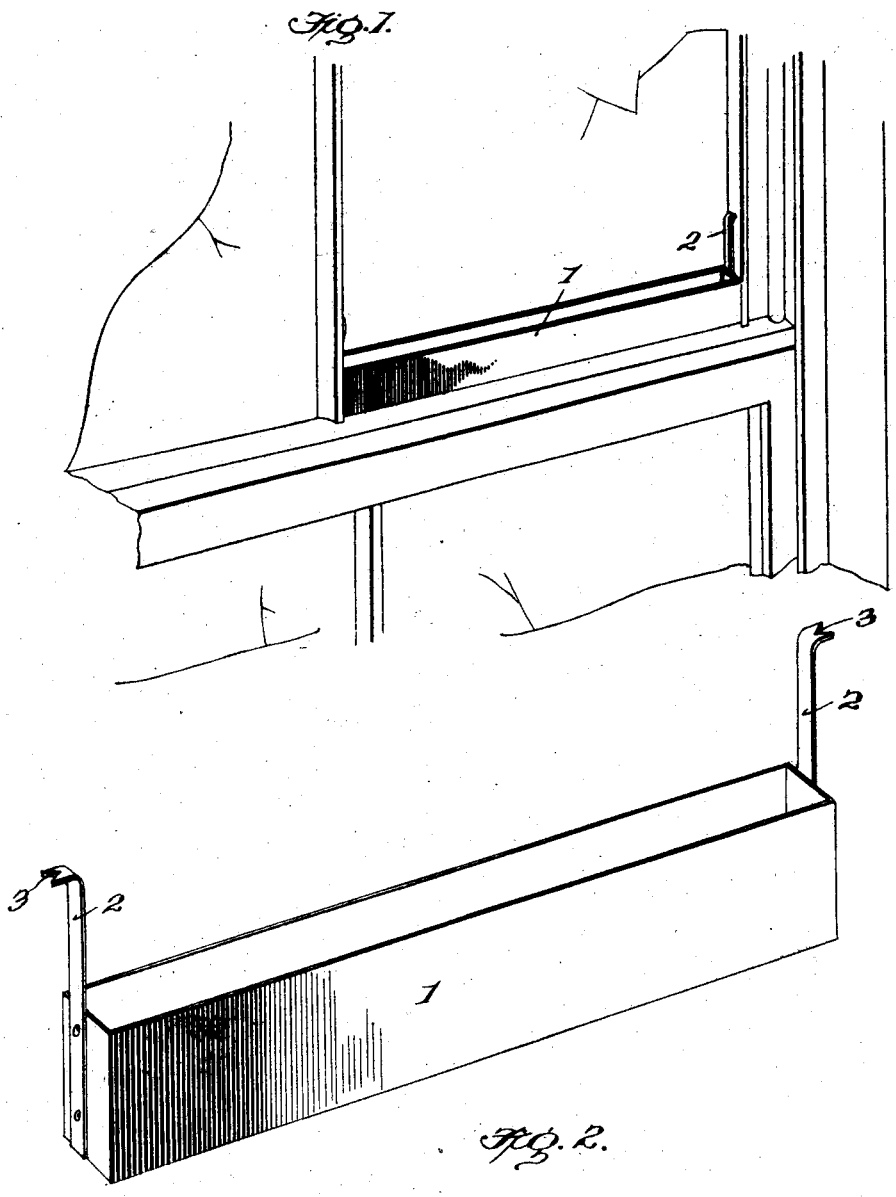

UNITED STATES PATENT OFFICE.

GUST KOMM, OF BUCKEYE, WASHINGTON.

FLY-TRAP.

No. 883,318.        Specification of Letters Patent.        Patented March 31, 1908.

Application filed July 11, 1907. Serial No. 383,280.

*To all whom it may concern:*

Be it known that I, GUST KOMM, a citizen of the United States, residing at Buckeye, in the county of Spokane and State of Washington, have invented certain new and useful Improvements in Fly-Traps, of which the following is a specification.

The present invention is in the nature of an improved insect trap and is more particularly designed for use in connection with house flies, advantage being taken of the fact that these flies usually congregate about the windows or light portions of a room.

The object of the invention is to design a simple and inexpensive trap which can be readily applied to a window sash so as to be held against the glass, the said trap operating effectively to catch the flies which strike against the glass and then glide around upon the surface of the same.

For a full description of the invention and the merits thereof and also to acquire a knowledge of the details of construction and the means for effecting the result, reference is to be had to the following description and accompanying drawings, in which:

Figure 1 is a perspective view showing the trap applied. Fig. 2 is a perspective view of the trap detached.

Corresponding and like parts are referred to in the following description and indicated in all the views of the drawings by the same reference characters.

In general the trap is in the nature of an elongated trough or reservoir 1 which is partially filled with oil or similar material and is designed to be supported against a window pane in such a manner as to receive any flies which may be moving along the surface of the glass. In the present instance this trough 1 is approximately rectangular in shape and is provided at its end portions with suitable hangers 2 for engagement with the sides of the frame inclosing the glass. These hangers 2 may be in the nature of upwardly extending spring strips having the extremities thereof extended outwardly and formed with the teeth 3 serving to bite into the sides of the glass receiving frame and thereby retain the trough 1 securely in position.

In the operation of the trap it will be readily apparent that after the same has been applied to a window frame as above described and as clearly shown in Fig. 1, any flies or other insects which may be moving along the surface of the glass will be readily received within the trough upon moving downwardly and after coming into contact with the oil will be retained within the trough.

Particular attention is directed to the fact that the provision of the hangers 2 enables the trap to be readily applied to any of the conventional types of window frame or to be quickly removed therefrom when desired.

Having thus described the invention, what is claimed as new is:

An insect trap adapted to be applied to a window sash, the said trap comprising an elongated trough fitting against the glass, and spring hangers extending upwardly from the ends of the trough, the extremities of the hangers being deflected outwardly and provided with teeth serving to bite into the sides of the sash and retain the trough in position.

In testimony whereof I affix my signature in presence of two witnesses.

GUST KOMM. [L. S.]

Witnesses:
    JOS. HAMOY,
    JAMES CHRISTENSEN.